Oct. 20, 1942.  F. P. ZIERDEN  2,299,521
HOSE REEL
Filed March 17, 1941
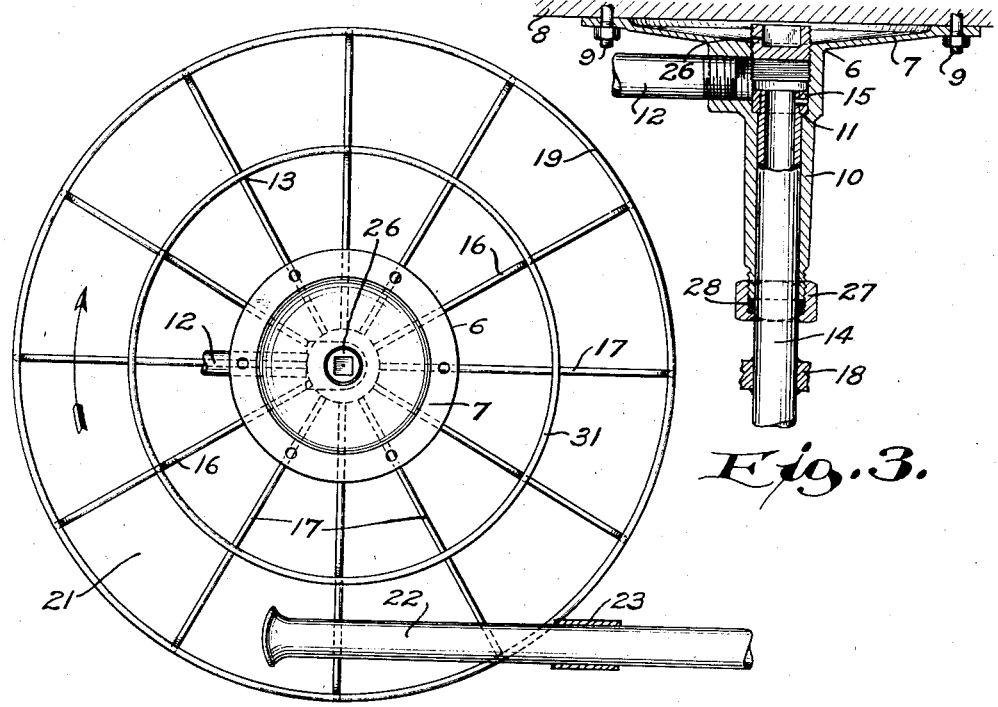
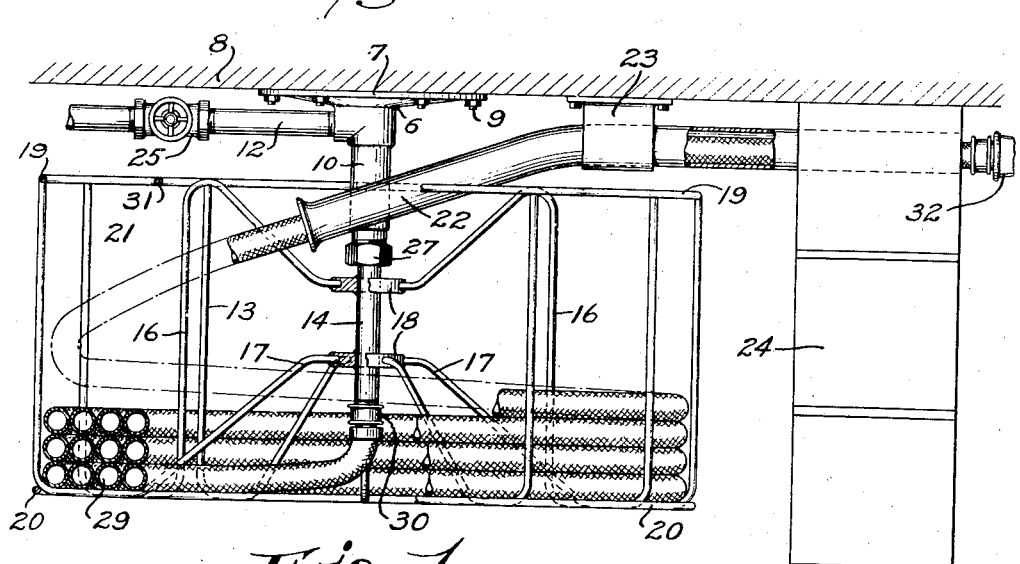
INVENTOR
F. P. Zierden
BY
Lieber & Lieber
ATTORNEYS.

Patented Oct. 20, 1942

2,299,521

UNITED STATES PATENT OFFICE 2,299,521

HOSE REEL

Frank P. Zierden, St. Francis, Wis.

Application March 17, 1941, Serial No. 383,675

10 Claims. (Cl. 299—78)

The present invention relates in general to improvements in the art of coiling elongated flexible elements such as rubber hose, and relates more specifically to various improvements in the construction and operation of hose reels especially adapted to wind garden hoses or the like.

An object of the invention is to provide an improved hose reel assemblage which is simple and compact in construction, and which is moreover highly effective in use.

Many different types of reels for winding garden hose or the like, into coil formation, have heretofore been proposed, and in some of these prior devices the inlet end of the hose was coupled to the hub, and the liquid supply was admitted through a pipe which provided a journal bearing for the revolving reel. The pivotal supports for some of these previous hose reels were mounted upon portable carriages, while in others the supports were fixedly mounted upon stationary structure; but in most cases the reel was suspended for rotation about a horizontal axis and was provided with a crank or handle for effecting manual rotation thereof. Because of the friction resulting from this horizontal suspension of the reel, it was necessary to provide a hand crank or to grasp the periphery of these prior reels in order to effect turning thereof; and in order to so turn the winding reel it was also necessary for the operator to have direct access to the rotor of the reel assemblage. These prior hose reels moreover did not make provision for properly and effectively guiding the hose so that it would automatically neatly coil or wind itself upon the rotor, and therefore did not permit housing the reel assemblage within a basement or other enclosure so as to protect the hose and preclude tampering therewith.

In my prior application Serial No. 339,271, filed June 7, 1940, I have shown and described an improved hose reel assemblage having a rotor formed primarily of wire and provided with an annular peripheral upwardly open hose coiling recess to the upper open end of which the hose was adapted to be fed through a fixed tubular guide disposed tangential relative to the upper open end of the recess. The rotor of this reel was journalled for rotation about a vertical axis, upon a fixed liquid supply pipe, and could be freely rotated by merely feeding the hose either inwardly or outwardly through the fixed hose guide, so that actual contact with the reel was not necessary and the assemblage could be housed and concealed within a basement or the like. While this prior assemblage of mine obviated most of the defects of other prior structures of this type, the prior application was not sufficiently clear as to certain details of construction, and the present application is therefore a continuation in part of the previous application as to common subject matter, and is being substituted therefor as to the novel features disclosed in both cases.

Some of the more specific objects of this invention may therefore be enumerated as follows:

To provide a new and useful garden hose reel adapted to be mounted within an enclosure such as a basement, and to be effectively actuated from the exterior of the enclosure for either winding or unwinding of the hose, and without necessitating direct contact between the reel rotor and the operator.

To provide an improved hose reeling assemblage having the rotor suspended for free rotation with minimum frictional resistance, and wherein the hose is delivered to and from the rotor in a manner which will insure most effective coiling and unwinding thereof.

To provide a compact and durable hose reel which can be readily installed and safely operated, and which is devoid of dangerous projections extending beyond the confines of the revolving hose receiving basket.

To provide an improved hose reel assemblage which is adapted to automatically and neatly coil the hose, which requires no lubrication or other attention, and which can be manufactured and installed at moderate cost.

To provide a hose reel basket which may be formed primarily of wire and thoroughly dynamically balanced so as to insure smooth operation and easy manipulation by a novice.

To provide a hose coiling assemblage which is always available for quick use, and in which the hose may be readily stored when not in use, within a protective enclosure, and which is adapted to receive and store hoses of maximum length in relatively compact condition.

To provide an improved hose guide assembly for hose reels, wherein the force of gravity assists in insuring uniform coiling or winding of the hose.

These and other specific objects and advantages of the present invention will be apparent from the following detailed description.

A clear conception of the several features constituting the present improvement, and of the mode of constructing and of operating garden hose reels built in accordance with the invention, may be had by referring to the drawing accompanying and forming a part of this specification and in which like reference characters designate the same or similar parts in the various views.

Fig. 1 is a part sectional side elevation of an improved hose reel installation confined within an enclosure and showing the water inlet pipe disposed in the plane of the view;

Fig. 2 is a top view of the hose reel assemblage of Fig. 1; and

Fig. 3 is an enlarged central vertical section through the improved hose reel suspension mechanism.

While the invention has been shown and described herein as being specifically embodied in a hose reel formed primarily of wire and especially adapted for winding or coiling rubber garden hose, it is not my desire or intent to thereby unnecessarily restrict the scope or utility of the improvement.

Referring to the drawing, the improved garden hose reel shown therein, comprises in general, a bracket 6 having an upper suspension plate 7 adapted for attachment to overhead structure 8 by means of bolts 9 or the like, and also having an elongated hollow pipe or support 10 formed integral with and depending from the plate 7 and provided with an internal thrust bearing 11 and a liquid supply pipe 12; a rotor or reel 13 having a central hub formed of an approximately upright tube or pipe 14 journalled in the bore of the support 10 and provided with a thrust collar 15 coacting with the bearing 11, and also having a series of U-shaped wires 16 and intervening wires 17 radiating from the hub flanges 18, and interconnected at their outer portions by upper and lower rings 19, 20 so as to provide an upwardly open U-shaped peripheral recess 21; and a tubular hose guide 22 fixedly suspended from the overhead structure 8 by means of a bracket 23, and being directed tangentially and downwardly at a slight angle into the upper open end of the recess 21.

The stationary bracket 6 may be formed of one piece or of separate pieces rigidly united as by welding, and may be fixedly suspended from any suitable structure 8 such as a basement ceiling or joists, preferably near an outer wall 24; and while the liquid supply pipe 12 is shown as being directed toward this wall, in actual practice this pipe 12 preferably extends parallel to the wall so that the shut-off valve 25 therein may be actuated from the outside with the aid of a long range control rod or key operatively connected to the valve handle in a well known manner. The bracket 6 is preferably suspended so that the axis of the bore of the hollow support 10 is disposed approximately vertical, and access to this bore and to the thrust bearing elements may be effected by means of a removable pipe plug 26. The depending tubular support 10 is preferably of considerable vertical length and rigidly formed so as to withstand side thrust, and the hollow spindle or pipe 14 should have a snug journal fit within the bore of the support 10, while the thrust ring or collar 15 which coacts with the internal thrust bearing 11 may be rigidly secured to the upper extremity of the pipe 14 by means of a pin as shown, or by shrinking the collar upon the pipe. The thrust bearing elements as well as the guide bearing, are normally surrounded by fresh liquid, and thus lubricated, and a sealing gland nut 27 and packing 28 may be provided at the lower end of the support 10 in order to prevent undesirable escape of liquid by leakage, see Fig. 3.

The rotor or reel 13 comprises the hub and wire basket having the annular peripheral upwardly open recess for receiving and coiling a flexible hose 29 as shown in Fig. 1, and the lower end of the hub spindle or pipe 14 is provided with standard threads for detachable attachment of the inlet end of the hose 29 thereto, with the aid of a standard coupling 30. The hub flanges 18 may be rigidly attached to the liquid conducting spindle or pipe 14 by welding or otherwise, and the radial wires 16, 17 are preferably equally spaced about the central vertical axis of the support 10 in order to insure accurate balancing of the rotor structure. Alternate radial wires 16 are formed with deep upwardly open U-shaped outer portions and have their inner ends rigidly attached to the upper hub flange 18, while the upper portions of these wires adjacent to the inner side of the annular recess 21 are rigidly interconnected by means of a wire ring 31. The intervening radial wires 17 have vertical outer end portions and horizontal lowermost portions the same as the corresponding portions of the wires 16, but the inner ends of these wires 17 are rigidly attached to the lower hub flange 18 and they are not connected to the inner ring 31. The outer vertical parallel portions of all of the radial wires 16, 17 are rigidly interconnected by the upper and lower outer rings 19, 20, and all of the wires and rings may be welded or otherwise firmly united so as to provide a durable reel or basket structure.

The tubular hose guide 22 should be of sufficient internal diameter to permit free advancement of the hose 29 therethrough, and while the end of this guide which is disposed above the upwardly open recess 21, is preferably inclined downwardly into this recess as shown in Fig. 1, the opposite end of the guide may be extended through the wall 24 and disposed approximately horizontal. The outer end of the flexible hose 29 is provided with a nozzle 32 which preferably cannot pass through the tubular guide 22 but which may be removed for withdrawal of the hose, and the stationary guide 22 may be fixedly supported in any desired manner, but should preferably be of considerable length and directed tangentially of the annular recess 21 as illustrated in Fig. 2. This guide tube should be formed of any durable material, and while the lower end of the inclined portion of the guide 22 may be disposed more or less within the upper open end of the recess 21, the tangential disposition thereof is important.

After the improved hose reel assemblage has been properly constructed and installed in an enclosure as described, its normal use is a simple matter. If the hose 29 has been previously wound upon the rotor or reel 13 as depicted in Fig. 1, unwinding of the hose may be readily effected without directly touching the reel, by merely grasping the nozzle 32 and pulling the flexible hose through the tubular guide 22 to any desired extent. During this procedure, the wire basket will be freely revolved and the hub pipe 14 will freely rotate within the fixed tubular support 10, about the central vertical axis of this support, in a counter clockwise direction as viewed in Fig. 2. The liquid supply valve 25 may then be manipulated to admit liquid under pressure to the interior of the hollow support 10 and from thence through the hollow spindle pipe 14 to the hose 29, whereupon the nozzle 32 may be opened or closed at will; and after sprinkling has been effected, the valve 25 may again be shut-off. In order to rewind or coil the hose 29 upon the reel, it is only necessary for the operator to push the longitudinally stiff but laterally flexible hose through the tubular guide 22 from the exterior of the enclosure or wall 24, and without directly touching the rotor 13. The relatively stiff hose 29 emerging from the inner end of the fixed guide 22 and entering the annular recess 21, will initially engage the outer vertical sections of the wires 16, 17 thereby imparting rotative impulses to the basket. As the basket continues to rotate, the hose 29 will gradually be wound about the annular series of inner vertical sections of the wires 16, 17, and this action will convert the intermittent propelling impulses into smooth continuous rotation of the basket. The hose 29 will thus be automatically and neatly coiled or wound within the rotor recess 21 as shown in Fig. 1, and while the feeding of the hose into the basket is relatively intermittent, the inertia of the revolving reel and increasing hose coils will effectively convert this feeding motion into smooth continuous rotation. The reel will accept the hose at any speed, and the successive coils of hose will be automatically formed and superimposed upon each other until the entire hose length has been wound upon the reel. After the valve 25 has been closed, the coiled hose may be readily drained by merely releasing the coupling 30.

From the foregoing detailed description, it will be apparent that my invention provides an improved hose reel assemblage which is extremely simple and compact in construction, and highly flexible and effective in use. The improved reel assembly is easily operable from the exterior of a housing or enclosure, through the medium of the hose alone, by virtue of the improved formation and disposition of the fixed tubular guide 22, and the hose may be quickly housed within a protective enclosure in extremely compact and neatly wound condition. The relatively deep upwardly open annular recess 21 formed by the radial basket wires 16, 17 makes it possible to utilize gravity to insure proper winding, and the downwardly open central depression formed by the inner inclined ends of the wires 17 makes it possible to attach the coupling 30 to the lower end of the hose pipe 14 entirely within the rotor 13 and above the bottom thereof. This feature eliminates undesirably projections beyond the confines of the basket, and while it is preferable to form the reel 13 of standard wire, this construction is not essential. The rotation of the reel 13 about an approximately vertical or upright axis, and the dynamically balanced formation thereof, are important in securing best results, and the assemblage should also be durably constructed so as to withstand normal abuse. The improved structure can be manufactured at moderate cost, easily installed, and has proven highly satisfactory in actual use.

It should be understood that it is not desired to limit this invention to the exact details of construction, or to the precise mode of installation and operation, herein shown and described, for various modifications within the scope of the claims, may occur to persons skilled in the art.

I claim:

1. In combination, a fixed hollow upright support, a rotary basket having a hollow supporting spindle journalled in said support and also having a wire frame secured to said hub and providing an upwardly open deep annular recess concentric with the axis of said support, means for detachably connecting the inlet end of a flexible hose to said spindle in communication with the interior of said support, and a fixed elongated tubular hose guide disposed directly above said recess and formed to direct the hose tangentially and downwardly at an oblique angle into the upper open end of said recess.

2. In combination, a stationary hollow upright support having a liquid supply associated therewith, a reel having a central hollow supporting spindle rotatably suspended from said support and also having a basket frame secured to said spindle and providing an upwardly open U-shaped annular recess concentric with the axis of said support, means for effecting detachable connection of the inlet end of a flexible hose with the interior of said support through said spindle and entirely above the bottom of said reel, and a hose guide formed to direct the hose tangentially into the upper open end of said recess.

3. In combination, a stationary hollow upright support having a liquid supply associated therewith, a reel having a central hollow supporting spindle rotatably suspended from said support and also having a basket frame secured to the lower end of said spindle and providing an upwardly open U-shaped annular recess concentric with the axis of said support, means for effecting detachable connection of the inlet end of a flexible hose with the interior of said support through said spindle and entirely above the bottom of said reel, and a downwardly directed elongated tubular hose guide fixedly suspended directly above said reel and formed to direct the hose tangentially and downwardly into the upper end of said recess so as to produce superimposed layers of coils.

4. In combination, a fixed mounting, a hollow support depending from said mounting and having a thrust bearing thereon, a reel having a central hollow supporting spindle suspended from said thrust bearing and rotatable about the axis of and within said support, said reel also having a relatively light frame suspended from the lower end of said spindle and providing an upwardly open annular recess and a central downwardly open depression, means for effecting attachment of the inlet end of a flexible hose to said spindle entirely within said depression to connect the hose with the interior of said support, and a tubular guide disposed directly above and extending into said upper recess for directing the hose into the upper open end thereof.

5. In combination, a fixed mounting, a hollow support depending from said mounting and having a thrust bearing thereon, a reel having a central hollow supporting spindle suspended from said thrust bearing and rotatable about the axis of and within said support, said reel also having a relatively light frame secured to said spindle and providing an upwardly open annular recess and a central downwardly open depression, means for effecting attachment of the inlet end of a flexible hose to said spindle entirely within said depression to connect the hose with the interior of said support, and a tubular fixed hose guide directed tangentially and downwardly into the upper open end of said recess.

6. In combination, a fixed downwardly directed liquid supply pipe having a thrust bearing therein, a reel having a central hollow supporting spindle suspended from said thrust bearing and being rotatable within said pipe, said reel having a peripheral upwardly open annular recess and a central downwardly open depression, means for detachably connecting the inlet end of a flexible hose with the lower open end of said spindle within said depression, and means for guiding the hose tangentially with respect to the upper open end of said recess.

7. In combination, a fixed downwardly directed liquid supply pipe having a thrust bearing therein, a reel having a central hollow supporting spindle suspended from said thrust bearing and being rotatable within said pipe, said reel having a peripheral upwardly open annular recess and a central downwardly open depression, means for detachably connecting the inlet end of a flexible hose with the lower open end of said spindle within said depression, and a fixed tubular guide for conducting the hose tangentially and at a slight inclination with respect to the upper open end of said recess.

8. In combination, a stationary downwardly directed liquid supply pipe having a thrust bearing at the upper interior thereof, a reel having a central hollow supporting spindle journalled within said pipe and suspended from said thrust bearing, said reel having a peripheral upwardly open annular recess and a central downwardly open depression, means for detachably connecting the inlet end of a flexible hose with the lower extremity of said hollow spindle entirely within said depression and above the bottom of said recess, and a fixed tubular guide for conducting the hose tangentially and downwardly into said recess.

9. In combination, a stationary downwardly directed liquid supply pipe having a thrust bearing at the upper interior thereof, a reel having a central hollow supporting spindle journalled within said pipe and suspended from said thrust bearing, said reel having a peripheral upwardly open annular recess and a central downwardly open depression, means for detachably connecting the inlet end of a flexible hose with the lower extremity of said hollow spindle entirely within said depression and above the bottom of said recess, and an elongated tubular hose guide fixedly disposed directly above said recess and extending tangentially and downwardly into the upper open end thereof.

10. In combination, a fixed hollow upright support having a liquid supply associated therewith, a reel having a central hollow spindle suspended from and journalled for rotation about the axis of said support, said reel also having a basket secured to said spindle and provided with an upwardly open peripheral recess, means for detachably connecting the inlet end of a flexible hose to said spindle above the bottom of said recess, and a fixed elongated hose guide disposed directly above and extending tangentially into the upper open end of said recess.

FRANK P. ZIERDEN.